(12) United States Patent
Inagaki et al.

(10) Patent No.: US 9,077,029 B2
(45) Date of Patent: Jul. 7, 2015

(54) NEGATIVE ACTIVE MATERIAL FOR RECHARGEABLE LITHIUM BATTERY AND RECHARGEABLE LITHIUM BATTERY INCLUDING THE SAME

(75) Inventors: Toru Inagaki, Osaka (JP); Naoya Kobayashi, Osaka (JP); Ki-Jun Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 555 days.

(21) Appl. No.: 13/005,042

(22) Filed: Jan. 12, 2011

(65) Prior Publication Data
US 2011/0206986 A1 Aug. 25, 2011

(30) Foreign Application Priority Data

Feb. 23, 2010 (JP) ................................ 2010-037422
Jul. 22, 2010 (KR) ........................ 10-2010-0071084

(51) Int. Cl.
| | | |
|---|---|---|
| *H01M 4/58* | (2010.01) | |
| *H01M 4/62* | (2006.01) | |
| *H01M 4/38* | (2006.01) | |
| *H01M 4/04* | (2006.01) | |
| *H01M 4/134* | (2010.01) | |
| *H01M 4/1395* | (2010.01) | |
| *H01M 10/0525* | (2010.01) | |
| *H01M 10/0566* | (2010.01) | |

(52) U.S. Cl.
CPC .............. *H01M 4/38* (2013.01); *H01M 4/0421* (2013.01); *H01M 4/134* (2013.01); *H01M 4/1395* (2013.01); *H01M 10/0525* (2013.01); *H01M 10/0566* (2013.01); *Y02E 60/122* (2013.01)

(58) Field of Classification Search
CPC ... H01M 4/386; H01M 4/0421; H01M 4/134; H01M 4/1395; H01M 10/0525; H01M 10/0566; H01M 4/38
USPC .................. 429/217, 218.1, 231.8; 252/182.1
See application file for complete search history.

(56) References Cited

U.S. PATENT DOCUMENTS

| | | |
|---|---|---|
| 5,395,711 A | 3/1995 | Tahara et al. |
| 6,012,658 A | 1/2000 | Khasin et al. |

(Continued)

FOREIGN PATENT DOCUMENTS

| | | |
|---|---|---|
| JP | 06318454 | 11/1994 |
| JP | 06325765 | 11/1994 |

(Continued)

OTHER PUBLICATIONS

Earl H. Blevis and R. D. Mathis, Silicon Monoxide—Properties and Evaporation Techniques, Testbourne Ltd., 1963.*

(Continued)

*Primary Examiner* — Milton I Cano
*Assistant Examiner* — Michael Dignan
(74) *Attorney, Agent, or Firm* — Robert E. Bushnell, Esq.

(57) ABSTRACT

A negative active material for a rechargeable lithium battery including a flake powder including a plurality of flakes, each flake including a plurality of silicon atoms and a plurality of oxygen atoms, wherein an oxygen atom amount for each flake ranges from 5 wt % to 36 wt % based on a total amount of silicon atoms and oxygen atoms, each flake having a thickness ranging from 30 nm to 500 nm and a ratio of an average longest dimension to the thickness ranging from 10 to 100.

19 Claims, 1 Drawing Sheet

(56) References Cited

U.S. PATENT DOCUMENTS

| | | |
|---|---|---|
| 7,402,829 B2 * | 7/2008 | Green ................................ 257/1 |
| 8,105,718 B2 | 1/2012 | Nakanishi et al. |
| 2005/0161678 A1 | 7/2005 | Weinert |
| 2006/0029862 A1 * | 2/2006 | Koshina et al. ............ 429/218.1 |
| 2008/0058459 A1 * | 3/2008 | Brand et al. ................... 524/493 |
| 2009/0075173 A1 | 3/2009 | Jeong et al. |
| 2009/0186273 A1 | 7/2009 | Lee et al. |
| 2009/0239151 A1 | 9/2009 | Nakanishi et al. |
| 2009/0311437 A1 | 12/2009 | Wheeler |
| 2010/0055563 A1 | 3/2010 | Nakanishi et al. |
| 2013/0072032 A1 | 3/2013 | Dutartre et al. |

FOREIGN PATENT DOCUMENTS

| | | |
|---|---|---|
| JP | 2002124254 | 4/2002 |
| JP | 2005-100959 A | 4/2005 |
| JP | 2006-12576 A | 1/2006 |
| JP | 2009-224168 A | 10/2009 |
| JP | 2011-62983 A | 3/2011 |
| KR | 1020070113066 A | 11/2007 |
| KR | 1020090099487 A | 9/2009 |
| KR | 1020090109225 A | 10/2009 |
| KR | 1020100024903 A | 3/2010 |
| KR | 1020100036478 A | 4/2010 |
| WO | 2007136164 A1 | 11/2007 |

OTHER PUBLICATIONS

Japanese Office Action issued on Oct. 15, 2013 by JPO in connection with Japanese Patent Application No. 2010-037422 and Request for Entry attached herewith.

Werner H. Baur, Silicon-Oxygen Bond Lengths, Bridging Angles Si—O—Si and Synthetic Low Tridymite, Acta Cryst.,B33, 2615.

* cited by examiner

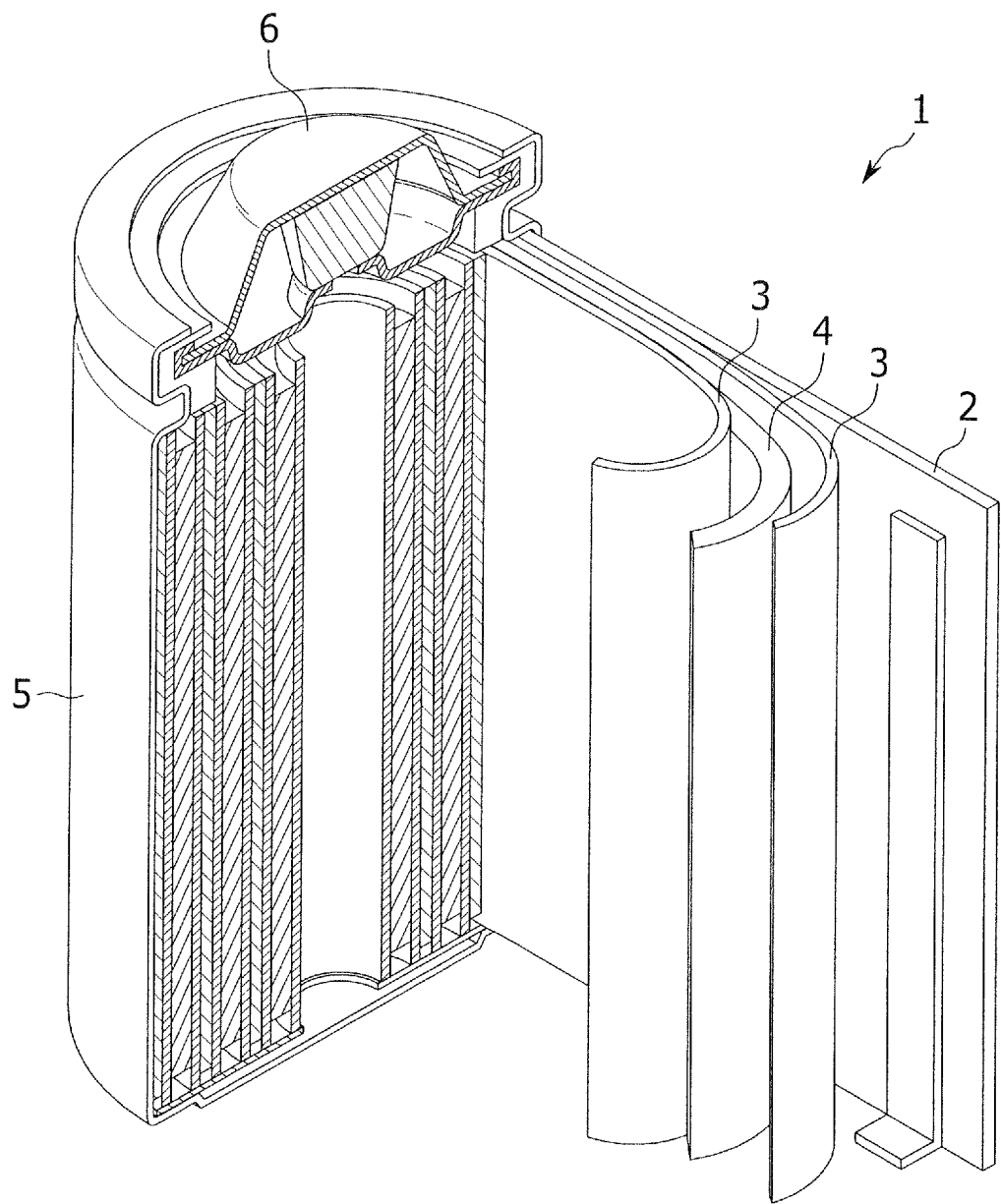

US 9,077,029 B2

NEGATIVE ACTIVE MATERIAL FOR RECHARGEABLE LITHIUM BATTERY AND RECHARGEABLE LITHIUM BATTERY INCLUDING THE SAME

CLAIM OF PRIORITY

This application makes reference to, incorporates the same herein, and claims all benefits accruing under 35 U.S.C. §119 from an application for NEGATIVE ACTIVE MATERIAL FOR RECHARGEABLE LITHIUM BATTERY AND RECHARGEABLE LITHIUM BATTERY INCLUDING THE SAME earlier filed in the Japanese Patent Office on 23 Feb. 2010 and Korean Intellectual Property Office on 22 Jul. 2010 and there duly assigned Japanese Patent Application No. 2010-037422 and Korean Patent Application No. 10-2010-0071084

BACKGROUND OF THE INVENTION

1. Field of the Invention

This disclosure relates to a negative active material for a rechargeable lithium battery, and a rechargeable lithium battery including the same.

2. Description of the Related Art

In recent times, due to reductions in size and weight of portable electronic equipment, there has been a need to develop batteries for use in the portable electronic equipment where the batteries have both high performance and large capacity. Batteries generate electric power by using materials capable of electrochemical reactions at positive and negative electrodes.

For example, a rechargeable lithium battery generates electricity due to change of chemical potentials when lithium ions are intercalated/deintercalated at positive and negative electrodes. The rechargeable lithium battery includes a material that can reversibly intercalate/deintercalate lithium ions as positive and negative active materials, and also an organic electrolyte or a polymer electrolyte.

As for negative active materials for a rechargeable lithium battery, various carbon-based materials such as artificial graphite, natural graphite, and hard carbon have been used because the carbon-based materials have good cycle-life characteristics and safety characteristics.

In order to provide a high-capacity rechargeable battery, there have been efforts to improve utility of a carbon-based active material and charge density per electrode volume. Recently, the rechargeable lithium battery using a carbon-based material as a negative active material exhibiting a capacity corresponding to a theoretical capacity (372 mAh/g) of graphite have been developed. Furthermore, charge density improvement also reaches a limit.

Therefore it is difficult to additionally improve the capacity of a battery using currently available carbon-based materials. In order to provide a high capacity rechargeable lithium battery, a metal material including silicon (Si), tin (Sn), or the like having a higher charge and discharge capacity compared to graphite has drawn attention as a negative active material for a rechargeable lithium battery, which is disclosed in Japanese Patent No. 2997741 and U.S. Pat. No. 5,395,711 to Tahara et al.

However, the volume of the metal-based material is too easily changed during charging and discharging, so, in the rechargeable lithium battery including the same, the negative active material layer is easily collapsed and the physical and electrical bond can not be maintained in the negative electrode. What is therefore needed is an improved negative active material for a rechargeable lithium battery that improves capacity but does not expand and contract upon charging and discharging.

SUMMARY OF THE INVENTION

One aspect of this disclosure provides a negative active material for a rechargeable lithium battery having low volume changes during charging and discharging, and having an excellent charge and discharge cycle characteristics.

Another aspect of this disclosure provides a rechargeable lithium battery including the negative active material for a rechargeable lithium battery.

According to one aspect of the present invention, there is provided a negative active material that includes a flake powder that includes a plurality of flakes, each flake including a plurality of silicon atoms and a plurality of oxygen atoms, wherein an oxygen atom amount ranges from about 5 wt % to about 38 wt % based on a total amount of silicon atoms and oxygen atoms, a thickness ranging from about 30 nm to about 500 nm and a ratio of an average longest dimension to a thickness ranging from about 10 to about 100. The average longest dimension of each flake of the negative active material may range from about 1 μm to about 20 μm.

According to another aspect of the present invention, there is provided a rechargeable lithium battery that includes a negative electrode comprising a negative active material comprising a flake powder comprising a plurality of flakes, each flake comprising a plurality of silicon atoms and a plurality of oxygen atoms, wherein oxygen atom amount ranges from about 5 wt % to about 38 wt % based on a total amount of silicon atoms and oxygen atoms, each flake having a thickness ranging from about 30 nm to about 500 nm and a ratio of an average longest dimension to a thickness ranging from about 10 to about 100, a positive electrode comprising a positive active material and an electrolyte. The average longest dimension of each flake of the negative active material may range from about 1 μm to about 20 μm. The negative electrode may also include a binder and a conductive material. The conductive material may include a carbon-based material. The binder may include an organic compound having an imide bond.

BRIEF DESCRIPTION OF THE DRAWING

FIG. 1 is a schematic view of a rechargeable lithium battery according to one embodiment of the present invention.

DETAILED DESCRIPTION OF THE INVENTION

Exemplary embodiments of the present invention will hereinafter be described in detail. However, these embodiments are only exemplary, and the present invention is not limited thereto.

The negative active material for a rechargeable lithium battery according to one embodiment includes a flake powder including silicon atoms and oxygen atoms, wherein the flake powder includes a plurality of flakes, each flake has an oxygen atom amount ranging from about 5 wt % to about 38 wt % based on a total amount of silicon and oxygen atoms, a thickness ranging from about 30 nm to about 500 nm, and a ratio of average longest dimension to thickness ranging from about 10 to about 100. Aspect ratio is, in general, the ratio between the longest and shortest dimensions of a particle and is defined more specifically in this instance as the ratio of the longest and shortest particle radii that pass through the geometric center of the particle. The oxygen amount is based on the total amount of silicon atoms and oxygen atoms (100 wt %) included in the negative active material for a rechargeable lithium battery.

The flake refers to one having a long plate shape having a longest dimension of approximate 10 or more times the thickness, which may be confirmed using an electron microscope or a particle size analyzer.

The plates of the negative active material for a rechargeable lithium battery are aligned in parallel in a negative electrode, so it may uniformly disperse pressure and distortion on the negative electrode. As a result, the flakes may effectively compensate effects from volume change during charging and discharging.

In the material including silicon atoms and oxygen atoms, the oxygen atoms are present in a non-equilibrium state, for example, it may include a state in which silicon particles are dispersed in an amorphous matrix composed of silicon atoms and oxygen atoms.

The material including the silicon atoms and oxygen atoms may be represented by $SiO_x$ ($0.1 \leq x \leq 1$) and the $SiO_x$ may contain impurities together with silicon atoms and oxygen atoms in a certain range as long as it does not deteriorate characteristics.

The $SiO_x$ has high capacity and excellent cycle-life characteristics compared to a carbon material such as graphite and the like. $SiO_x$ has a smaller volume change rate during charging and discharging, and $SiO_x$ has excellent charge and discharge cycle characteristics and less volumetric change compared to a particle consisting of only silicon (Si).

In addition, as the $SiO_x$ has a flake shape having the same size and shape as mentioned, most of the flakes are aligned in a direction parallel to the current collector while fabricating the negative electrode. As a result, the pressure and distortion due to the volume change during charging and discharging are uniformly dispersed, so the physical and electrical bonds are maintained in the negative electrode after repeated charge and discharge cycles.

The $SiO_x$ is a flake powder having a thickness of about 30 nm to about 500 nm and a ratio of an average longest dimension to a thickness of about 10 to about 100.

The negative active material for a rechargeable lithium battery may effectively compensate the effects of volume change during charging and discharging since the flakes are aligned in parallel to each other in a negative electrode, and pressure and distortion are uniformly dispersed in the negative electrode.

For example, the negative active material may have an average major diameter of about 1 μm to about 20 μm. If the average major diameter ranges from about 1 μm to about 20 μm, the flakes may have less affect on volume change due to expansion and shrinkage during charging and discharging, and the flakes may not deteriorate the charge and discharge capacity. Furthermore, the flakes may prevent cracks of the active material powder that may be caused by the volume change during charging and discharging and the flakes may improve the charge and discharge cycle characteristics.

The $SiO_x$ may have an oxygen amount ranging from about 5 wt % to about 38 wt %, or for example, from about 10 wt % to about 30 wt %, or of about from 15 wt % to about 25 wt %. When the $SiO_x$ has an oxygen amount within these ranges, they may maintain a high electron conductivity to provide excellent charge and discharge capacity, and the flakes may provide good charge and discharge cycle characteristics. On the other hand, the oxygen amount of $SiO_x$ may be measured by inert gas fused infrared absorption or the like. The oxygen amount refers to an amount of oxygen based on the total amount of $SiO_x$ (100 wt %).

The flake $SiO_x$ may be obtained in accordance with the following method. The flakes may be provided by using a raw material of only silicon metal or a mixture of silicon metal and silicon monoxide (SiO) and/or silicon dioxide ($SiO_2$), forming an oxide thereof on the surface of a substrate to an appropriate thickness by sputtering or vacuum deposition under an atmosphere by controlling a partial pressure of oxygen, separating the obtained layer from the substrate and pulverizing the same.

The substrate may include a resin film such as polyethylene telephthalate, polyethylene, polypropylene, or the like, and a metal foil such as copper, stainless steel, or the like. The pulverizing of the obtained layer may include wet-pulverizing in an organic solvent using a ball mill.

According to another embodiment, a rechargeable lithium battery is provided that includes the negative electrode including a negative active material, a positive electrode including a positive active material, and an electrolyte.

Rechargeable lithium batteries may be classified as lithium ion batteries, lithium ion polymer batteries, and lithium polymer batteries according to the presence of a separator and the kind of electrolyte used therein. The rechargeable lithium batteries may have a variety of shapes and sizes, and include cylindrical, prismatic, coin, or pouch-type batteries, and may be thin film batteries or may be rather bulky in size. Structures and fabricating methods for lithium ion batteries pertaining to the present invention are well known in the art.

Turning now to FIG. 1, FIG. 1 is a schematic view of a rechargeable lithium battery according to one embodiment of the present invention. As shown in FIG. 1, the rechargeable lithium battery 1 includes a negative electrode 2, a positive electrode 4, and a separator 3 interposed between the negative electrode 2 and the positive electrode 4, an electrolyte (not shown) impregnated in the negative electrode 2, the positive electrode 4, and the separator 3, and a sealing member 6 sealing a battery case 5. Such a rechargeable lithium battery 1 is fabricated by sequentially stacking the negative electrode 2, positive electrode 4, and separator 3, spiral-winding the resultant, and accommodating the spiral-wound body into the battery case 5.

The negative electrode 2 includes a current collector and a negative active material layer disposed thereon. The negative active material layer includes a negative active material, a binder, or optionally a conductive material.

The current collector may be selected from the group consisting of a copper foil, a nickel foil, a stainless steel foil, a titanium foil, a nickel foam, a copper foam, a polymer substrate coated with a conductive metal, and combinations thereof. Alternatively, the current collector may be omitted by providing a negative electrode where the negative active material is pressed and compressed.

The negative active material may include the above-described negative active material for a rechargeable lithium battery, and furthermore, at least one of a material that reversibly intercalates/deintercalates lithium ions, a lithium metal, a lithium metal alloy, a material being capable of doping lithium, or a transition metal oxide that may be further used in combination with the negative active material. The negative active material layer may further include additives such as a filler, a dispersing agent, or the like, as needed.

The material that reversibly intercalates/deintercalates lithium cations is a carbon material, and any carbon-based negative active material generally used in a lithium cation rechargeable battery may be used, such as crystalline carbon, amorphous carbon, or a combination thereof. Non-limiting examples of the crystalline carbon include graphite, such as shapeless, sheet-type, flake-type, spherical, or fibrous natural graphite or artificial graphite. Examples of the amorphous carbon include soft carbon or hard carbon, mesophase pitch carbide, or fired coke.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, Sn, or a combination thereof.

Examples of the material being capable of doping lithium include Si, a Si—A alloy (where A is an element selected from the group consisting of an alkali metal, an alkaline-earth metal, a group 13 element, a group 14 element, a transition element, a rare earth element, and combinations thereof, and is not Si), Sn, $SnO_2$, a Sn—G alloy (where G is an element selected from the group consisting of an alkali metal, an alkaline-earth metal, a group 13 element, a group 14 element, a transition element, a rare earth element, and combinations thereof, and is not Sn), or mixtures thereof. At least one of these materials may be mixed with $SiO_2$. The elements A and G may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. Examples of the transition metal oxide include vanadium oxide, lithium vanadium oxide, or the like.

The binder improves binding properties of negative active material particles with one another and with a current collector. Examples of the binder may include a compound including an imide bond, polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, or the like. The compound including an imide bond may be polyimide, polyamideimide, polybenzimidazole, or the like. An exemplary of the binder may be a compound including an imide bond such as polyimide, polyamideimide, polybenzimidazole, or the like.

The conductive material is included to improve electrode conductivity. Any electrically conductive material may be used as a conductive material unless it causes a chemical change. Examples of the conductive material include natural graphite, artificial graphite, carbon black, acetylene black, ketjen black, a carbon fiber, a metal powder or a metal fiber including copper, nickel, aluminum, silver, and so on, a polyphenylene derivative, or mixtures thereof.

The positive electrode 4 includes a positive active material layer and a current collector supporting the positive active material layer. The current collector may be aluminum (Al), but is not limited thereto. The positive active material layer includes a positive active material. The positive active material may include a compound that may intercalate/deintercalate lithium ions such as a lithiated intercalation compound. The positive active material may include a composite oxide including at least one selected from the group consisting of cobalt, manganese, and nickel, as well as lithium.

In one embodiment, the following lithium-containing compounds may be used: $Li_aA_{1-b}B_bD_2$ (0.90≤a≤1.8 and 0≤b≤0.5); $Li_aE_{1-b}B_bO_{2-c}D_c$ (0.90≤a≤1.8, 0≤b≤0.5, and 0≤c≤0.05); $Li_aE_{2-b}B_bO_{4-c}D_c$ (0.90≤a≤1.8, 0≤b≤0.5 and 0≤c≤0.05); $Li_aNi_{1-b-c}Co_bB_cD_\alpha$ (0.90≤a≤1.8, 0≤b≤0.5, 0≤c≤0.05, and 0≤α≤2); $Li_aN_{1-b-c}Co_bB_4O_{2-60}F_\alpha$ (0.90≤a≤1.8, 0≤b≤0.5, 0≤c≤0.05, and 0<α<2); $Li_aNi_{1-b-c}Co_bB_cO_{2-\alpha}F_\alpha$ (0.90≤a≤1.8, 0≤b≤0.5, 0≤c≤0.05, and 0<α<2); $Li_aNi_{1-b-c}Mn_bB_cD_\alpha$ (0.90≤a≤1.8, 0≤b≤0.5, 0≤c≤0.05, and 0<α≤2); $Li_aNi_{1-b-c}Mn_bB_cO_{2-\alpha}F_\alpha$ (0.90≤a≤1.8, 0≤b≤0.5, 0≤c≤0.05, and 0<α<2); $Li_aNi_{1-b-c}Mn_bB_cO_{2-\alpha}F_\alpha$ (0.90≤a≤1.8, 0≤b≤0.5, 0≤c≤0.05, and 0<α<2); $Li_aNi_bE_cG_dO_2$ (0.90≤a≤1.8, 0≤b≤0.9, 0≤c≤0.5, and 0.001≤d≤0.1); $Li_aNi_bCo_cMn_dG_eO_2$ (0.90≤a≤1.8, 0≤b≤0.9, 0≤c≤0.5, 0≤d≤0.5, and 0.001≤e≤0.1); $Li_aNiG_bO_2$ (0.90≤a≤1.8 and 0.001≤b≤0.1); $Li_aCoG_bO_2$ (0.90≤a≤1.8 and 0.001≤b≤0.1); $Li_aMnG_bO_2$ (0.90≤a≤1.8 and 0.001≤b≤0.1); $Li_aMn_2G_bO_4$ (0.90≤a≤1.8 and 0.001≤b≤0.1); $QO_2$; $QS_2$; $LiQS_2$; $V_2O_5$; $LiV_2O_5$; $LiXO_2$; $LiNiVO_4$; $Li_{(3-f)}J_2(PO_4)_3$ (0≤f≤2); $Li_{(3-f)}Fe_2(PO_4)_3$ (0≤f≤2); $LiFePO_4$; and a combination thereof.

In the above Chemical Formulae, A is selected from the group consisting of Ni, Co, Mn, and a combination thereof; B is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; F is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; X is selected from the group consisting of Cr, V, Fe, Sc, Y, and a combination thereof; and J is selected from the group consisting of V, Cr, Mn, Co, Ni, Cu, and a combination thereof.

The positive active material may include the compound with a coating layer, or a mixture of the compound without the coating layer and the compound coated with the coating layer. The coating layer may include at least one coating element compound selected from the group consisting of an oxide of the coating element, a hydroxide of the coating element, an oxyhydroxide of the coating element, an oxycarbonate of the coating element, and a hydroxycarbonate of the coating element. The compound for the coating layer may be either amorphous or crystalline. The coating element included in the coating layer may be selected from the group consisting of Mg, Al, Co, K, Na, Ca, Si, Ti, V, Sn, Ge, Ga, B, As, Zr, and combinations thereof. The coating process may include any conventional processes as long as it does not cause any side effects on the properties of the positive active material (e.g., spray coating, immersing), which are well known to persons having ordinary skill in this art, so a detailed description thereof is omitted.

The positive active material layer may include the binder that improves binding properties of the positive active material particles to each other and to a current collector. Examples of the binder include at least one selected from the group consisting of a polyimide, polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, or the like, but is not limited thereto.

The positive active material layer may include a conductive material that improves electrical conductivity of the positive electrode. Any electrically conductive material may be used as a conductive agent unless it causes a chemical change. Examples of the conductive material may include carbon-based materials such as natural graphite, artificial graphite, carbon black, acetylene black, ketjen black, carbon fiber, or the like; metal-based materials including a metal powder or a metal fiber of copper, nickel, aluminum, or the like; conductive polymer materials such as polyphenylene derivatives; or mixtures thereof.

The positive active material layer may be included with a suitable amount of additives such as a filler, a dispersing agent, and the like, as needed.

The negative electrode 2 and the positive electrode 4 may be fabricated by a method including mixing an active material, a binder, or the like in a solvent to produce an active material composition, and coating the composition on a current collector. Any electrically conductive material can be used as a conductive agent unless it causes a chemical change. The solvent includes N-methylpyrrolidone and the like, but is not limited thereto.

The electrolyte includes a non-aqueous organic solvent and a lithium salt. The non-aqueous organic solvent serves as a medium for transmitting ions taking part in the electrochemical reaction of a battery. The non-aqueous organic solvent serves as a medium for transmitting ions taking part in the electrochemical reaction of a battery. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. Examples of the ester-based solvent may include methyl acetate, ethyl acetate, n-propyl acetate, dimethyl acetate, methyl propionate, ethyl propionate, butyrolactone, decanolide, valerolactone, mevalonolactone, caprolactone, or the like. Examples of the ether-based solvent may include dibutyl ether, tetraglyme, diglyme, 1,2-dimethoxyethane, 1,2-diethoxyethane, ethoxymethoxyethane, 2-methyltetrahydrofuran, tetrahydrofuran, or the like. Examples of the ketone-based solvent may include cyclohexanone or the like. Examples of the alcohol-based solvent may include ethanol, isopropyl alcohol, or the like, and examples of the aprotic solvent include nitriles such as R—CN (wherein R is a C2 to C20 linear, branched, or cyclic hydrocarbon, a double bond, an aromatic ring, or an ether bond), amides such as dimethylformamide, dioxolanes such as 1,3-dioxolane, sulfolanes, or the like.

The non-aqueous organic solvent may be used singularly or in a mixture. When the organic solvent is used in a mixture, the mixture ratio can be controlled in accordance with desirable battery performance.

The carbonate-based solvent may include a mixture of a cyclic carbonate and a linear carbonate. The cyclic carbonate and the chain carbonate are mixed together in the volume ratio of 1:about 1 to 1:about 9, and when the mixture is used as an electrolyte, the electrolyte performance may be enhanced.

In addition, the electrolyte of the present invention may further include mixtures of carbonate-based solvents and aromatic hydrocarbon-based solvents. The carbonate-based solvents and the aromatic hydrocarbon-based solvents are preferably mixed together in the volume ratio of about 1:1 to about 30:1.

The aromatic hydrocarbon-based organic solvent may be represented by the following Chemical Formula 1.

[Chemical Formula 1]

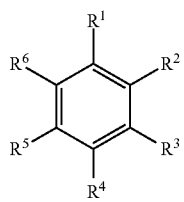

In Chemical Formula 1, $R^1$ to $R^6$ are independently hydrogen, a halogen, a C1 to C10 alkyl, a C1 to C10 haloalkyl, or combinations thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or combinations thereof.

The non-aqueous electrolyte may further include vinylene carbonate or an ethylene carbonate-based compound of the following Chemical Formula 2.

[Chemical Formula 2]

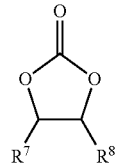

In Chemical Formula 2, $R^7$ and $R^8$ are independently hydrogen, a halogen, a cyano group (CN), a nitro group ($NO_2$), and a C1 to C5 fluoroalkyl group, provided that at least one of $R^7$ and $R^8$ is a halogen, a nitro group ($NO_2$), or a C1 to C5 fluoroalkyl group and $R^7$ and $R^8$ are not simultaneously hydrogen.

The ethylene carbonate-based compound includes difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The use amount of the additive for improving cycle life may be adjusted within an appropriate range.

The lithium salt supplies lithium ions in the battery, operates a basic operation of a rechargeable lithium battery and improves lithium ion transport between positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(CxF_{2x+1}SO_2)(CyF_{2y+1}SO_2)$, (where x and y are natural numbers), LiCl, LiI, and $LiB(C_2O_4)_2$ (lithium bis(oxalato)borate, LiBOB). The lithium salt may be used at about a 0.1 to about 2.0M concentration. When the lithium salt is included at the above concentration range, electrolyte performance and lithium ion mobility may be enhanced due to optimal electrolyte conductivity and viscosity.

The rechargeable lithium battery may further include a separator between a negative electrode and a positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Hereinafter, the embodiments are illustrated in more detail with reference to examples. These examples, however, should not in any sense be interpreted as limiting the scope of the present invention. Furthermore, what is not described in this specification can be sufficiently understood by those who have knowledge in this field and will not be illustrated here.

Preparation of Negative Active Material

Example 1

A substrate is a 100μm-thick polyethylene terephthalate film, and it is coated with a $SiO_x$ (x=0.092) film on its surface in a thickness of 200 nm according to the following RF sputtering.

The target is metal silicon having a purity of 6N, and the distance between the substrate and the target is set into 65 mm; the sputter gas is an argon-0.1% oxygen mixed gas; and the chamber internal pressure is controlled to 0.1 Pa during the reaction. The output of high frequency is controlled to 400 W.

The provided $SiO_x$ (x=0.14) is separated from the substrate and is wet-pulverized for 30 minutes by a ball mill while using an ethanol solvent and is then dried to provide an active material A.

The obtained active material A has a flake shape. The active material A is measured for longest dimension using electron microscope photography, and it shows that the average is 10 μm which is distributed from 5 μm to 20 μm, there is no powder broken out in a thickness direction, and all powder maintains the thickness of coating process which is 200 nm. As a result, the ratio of an average longest dimension to thickness is 50.

The oxygen amount included in the active material A is 5.0 wt % if measured using inert gas fused infrared absorbance. The oxygen amount refers to the oxygen (O) atoms based on the total amount of $SiO_x$ (x=0.092) (100 wt %) included in the active material A.

Example 2

An active material B having a flaky shape is prepared in accordance with the same procedure as in Example 1, except that it is wet-pulverized for 5 hours in an ethanol solvent using a ball mill instead of wet-pulverizing for 30 minutes.

The active material B has an average longest dimension of 4 μm, distributed from 2 μm to 8 μm, there is no powder broken in a thickness direction, and all powder maintains the thickness of the coating process which is 200 nm. As a result, a ratio of average longest dimension to thickness is 20.

The oxygen amount included in the active material B is 5.8 wt %. The oxygen amount refers to the oxygen (O) atoms based on the total amount of $SiO_x$ (x=0.108) (100 wt %) included in the active material B.

Example 3

An active material C having a flaky shape is prepared in accordance with the same procedure as in Example 1, except that an argon-1.0% oxygen mixed gas is used as the sputter gas instead of the argon-0.1% oxygen mixed gas.

The active material C has the same shape as the active material A of Example 1, and the oxygen amount is 9.8 wt %. The oxygen amount refers to the oxygen (O) atoms based on the total amount of $SiO_x$ (x=0.19) (100 wt %) included in the active material C.

Example 4

An active material D having a flaky shape is prepared in accordance with the same procedure as in Example 1, except that the sputter gas is an argon-3.0% oxygen mixed gas instead of the argon-0.1% oxygen mixed gas.

The active material D has the same shape as the active material A of Example 1, and the oxygen amount is 20.4 wt %. The oxygen amount refers to the oxygen (O) atoms based on the total amount of $SiO_x$ (x=0.45) (100 wt %) included in the active material D.

Example 5

An active material E having a flaky shape is prepared in accordance with the same procedure as in Example 1, except that the sputter gas is an argon-5.0% oxygen mixed gas instead of the argon-0.1% oxygen mixed gas.

The active material E has the same shape as the active material A of Example 1, and the oxygen amount is 29.1 wt %. The oxygen amount refers to the oxygen (O) atoms based on the total amount of $SiO_x$ (x=0.72) (100 wt %) included in the active material E.

Comparative Example 1

An active material F is prepared in accordance with the same procedure as in Example 1, except that the $SiO_x$ film is formed to a thickness of 5 μm according to RF sputtering instead of 200 nm.

The active material F has a shape of block (short sheet) and a thickness of 1 μm to 3 μm and an average longest dimension of 5 μm distributed from 2 μm to 10 μm, and a ratio of average longest dimension to thickness of 1.7 to 5.

The oxygen amount included in active material F is 5.0 wt %. The oxygen amount refers to the oxygen (O) atoms based on the total amount of $SiO_x$ (x=0.092) (100 wt %) included in the active material F.

Comparative Example 2

An active material G is prepared in accordance with the same procedure as in Example 1, except that it is dry-pulverized in a mortar instead of wet-pulverizing in a solvent of ethanol for 30 minutes using a ball mill.

The active material G has an average major diameter of 50 μm distributed from 35 μm to 100 μm. There is no powder broken in the thickness direction, and all powder maintains the thickness of 200 nm which is the thickness on forming the layer, so a ratio of average major diameter to thickness is 250.

The oxygen amount included in active material G is 5.0 wt %. The oxygen amount refers to the oxygen (O) atoms based on the total amount of $SiO_x$ (x=0.092) (100 wt %) included in the active material G.

Comparative Example 3

An active material H is prepared in accordance with the same procedure as in Example 1, except that the sputter gas includes an argon-7.0% oxygen mixed gas instead of the argon-0.1% oxygen mixed gas.

The active material H has the same shape as the active material A of Example 1, and the oxygen amount is 39.1 wt %. The oxygen amount refers to the oxygen (O) atoms based on the total amount of $SiO_x$ (x=1.12) (100 wt %) included in the active material H.

(Fabrication of Rechargeable Lithium Battery)

Each negative active material obtained from Examples 1 to 5 and Comparative Examples 1 to 3 is mixed with a binder of polyamideimide and a conductive material of denka black (manufactured by Denki kagaku koyo Co. Ltd.) in a weight ratio of 80:10:10 and dispersed in N-methyl-2-pyrrolidone (NMP) to provide a negative active material slurry. Each negative active material slurry is coated on 10 μm-thick copper foil (negative electrode current collector) at 5 mg/cm$^2$, dried at 130° C. and thermo-set at 250° C., and punched in a disc having a diameter of 13 mm and pressed to provide a negative electrode.

Using the electrode and a counter electrode of metal lithium, a coin cell is fabricated. A separator for the coin cell is a polyethylene porous layer having a thickness of 20 μm, and the electrolyte is prepared by mixing a lithium salt of 1.2M LiPF$_6$ into a solvent of ethylene carbonate (EC) and diethyl carbonate (DEC) in a volume ratio of 3:7.

(Assessment of Cycle Characteristics)

Each coin cell obtained from Examples 1 to 5 and Comparative Examples 1 to 3 is charged at a constant current of 0.05 C to 0.005V (Li/Li$^+$) and discharged at 0.05 C to a final voltage of 1.4V (Li/Li$^+$), and is then measured for discharge capacity at the first cycle. It is charged at a constant current of 0.5 C to 0.005V (Li/Li$^+$) and discharged at 0.5 C to 1.4V (Li/Li$^+$), and this is repeated for 50 cycles. The results are shown in the following Table 1.

TABLE 1

| | 1st cycle discharge capacity (mAh/g) | 51st cycle/2nd cycle discharge capacity ratio (%) |
|---|---|---|
| Example 1 | 3630 | 70 |
| Example 2 | 3600 | 72 |
| Example 3 | 3200 | 76 |
| Example 4 | 2460 | 80 |
| Example 5 | 1880 | 82 |
| Comparative Example 1 | 3580 | 48 |
| Comparative Example 2 | 3400 | 45 |
| Comparative Example 3 | 200 | 30 |

In the coin cells according to Examples 1 to 5, it is confirmed that the discharge capacity at the first cycle decreases upon increasing the oxygen amount included in SiO$_x$. On the other hand, the 51st cycle/2nd cycle discharge capacity ratio showing the discharge capacity retention during charging and discharging cycles is improved by this increased oxygen amount to provide improved battery characteristics.

On the other hand, in Comparative Example 1, since the active material does not have a flake shape, it is significantly affected from the volume change due to the expansion and shrinkage, so the discharge capacity is very low after 51 cycles.

In Comparative Example 2, since the ratio of average longest dimension to thickness is excessive even though it has a flake shape, it is affected by the volume change during charging and discharging to cause a significant crack, and thereby the electrolyte is decomposed on the surface exposed by the crack to reduce the charge and discharge cycle characteristics.

In addition, in Comparative Example 3, since the oxygen amount of SiO$_x$ is excessive, the electrical conductivity reduced, and the charge and discharge capacity is significantly lowered.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting in any way.

What is claimed is:

1. A negative active material for a rechargeable lithium battery, comprising:
    a flake powder that comprises a plurality of flakes deposited on a negative electrode of a rechargeable lithium battery, each flake including a plurality of silicon atoms and a plurality of oxygen atoms, an oxygen atom amount ranging from about 5 wt % to about 36 wt % based on a total amount of silicon atoms and oxygen atoms,
    the flakes each having a long plate shape and being aligned substantially in parallel in relation to each other,
    the flakes each having a thickness ranging from about 30 nm to about 500 nm, the thickness of a flake being two times the shortest radius passing through a geometric center of the flake,
    the flakes having an average aspect ratio ranging from about 10 to about 100, the aspect ratio being the ratio of the longest flake radius passing through the geometric center of the flake to the shortest flake radius passing through the geometric center of the flake.

2. The negative active material of claim 1, wherein the average longest dimension of each flake of the negative active material ranges from about 1 μm to about 20 μm.

3. The negative active material of claim 1, further comprising a binder comprising a compound selected from a group consisting of a compound comprising an imide bond, polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber and an epoxy resin.

4. The negative active material of claim 1, wherein an oxygen atom amount ranges from about 10 wt % to about 30 wt % based on a total amount of silicon atoms and oxygen atoms.

5. The negative active material of claim 1, wherein an oxygen atom amount ranges from about 15 wt % to about 25 wt % based on a total amount of silicon atoms and oxygen atoms.

6. The negative active material of claim 1, further comprising silicon particles being dispersed in an amorphous matrix composed of the silicon atoms and the oxygen atoms.

7. The negative active material of claim 1, further comprising a material selected from a group consisting of a material that reversibly intercalates/deintercalates lithium ions, a lithium metal, a lithium metal alloy, a material being capable of doping lithium and a transition metal oxide.

8. A rechargeable lithium battery, comprising:
    a negative electrode comprising a negative active material comprising a flake powder comprising a plurality of flakes, each flake comprising a plurality of silicon atoms and a plurality of oxygen atoms, oxygen atom amount ranging from about 5 wt % to about 36 wt % based on a total amount of silicon atoms and oxygen atoms, each flake having a long plate shape, each flake having a thickness ranging from about 30 nm to about 500 nm, the thickness of a flake being two times the shortest radius passing through a geometric center of the flake, and an aspect ratio of from about 10 to about 100, the aspect ratio being the ratio of the longest flake radius passing through the geometric center of the flake to the shortest flake radius passing through the geometric center of the flake;
a positive electrode comprising a positive active material; and
an electrolyte.

9. The rechargeable lithium battery of claim 8, wherein the average longest dimension of each flake of the negative active material ranges from about 1 μm to about 20 μm.

10. The rechargeable lithium battery of claim 8, wherein the negative electrode further comprises:
a binder; and
a conductive material.

11. The rechargeable lithium battery of claim 10, wherein the conductive material comprises a carbon-based material.

12. The rechargeable lithium battery of claim 10, wherein the binder comprises an organic compound having an imide bond.

13. The rechargeable battery of claim 8, wherein the negative electrode further comprises a current collector selected from a group consisting of a copper foil, a nickel foil, a stainless steel foil, a titanium foil, a nickel foam, a copper foam, a polymer substrate coated with a conductive metal, and combinations thereof.

14. The rechargeable battery of claim 13, wherein the negative active material is arranged on a current collector, wherein most of the flakes are aligned in a direction parallel to the current collector.

15. The rechargeable battery of claim 8, further comprising a binder comprising a compound selected from a group consisting of a compound comprising an imide bond, polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber and an epoxy resin.

16. The rechargeable battery of claim 8, wherein an oxygen atom amount ranges from about 10 wt % to about 30 wt % based on a total amount of silicon atoms and oxygen atoms.

17. The rechargeable battery of claim 8, wherein an oxygen atom amount ranges from about 15 wt % to about 25 wt % based on a total amount of silicon atoms and oxygen atoms.

18. The rechargeable battery of claim 8, further comprising silicon particles being dispersed in an amorphous matrix composed of the silicon atoms and the oxygen atoms.

19. The rechargeable battery of claim 8, further comprising a material selected from a group consisting of a material that reversibly intercalates/deintercalates lithium ions, a lithium metal, a lithium metal alloy, a material being capable of doping lithium and a transition metal oxide.

* * * * *